July 1, 1947.  N. I. KORMAN  2,423,390
REFLECTOMETER FOR TRANSMISSION LINES AND WAVEGUIDES
Filed March 29, 1944  2 Sheets-Sheet 1
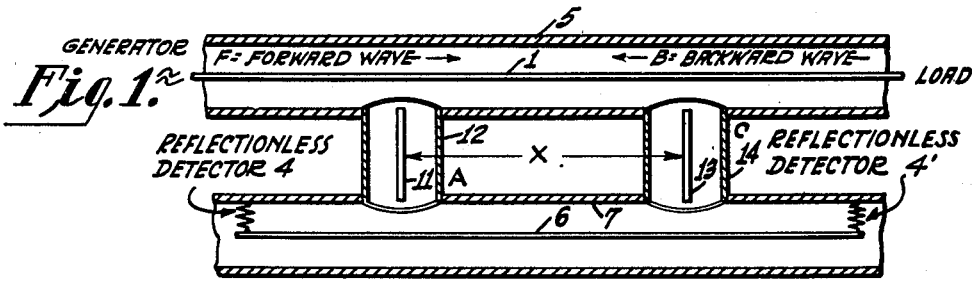
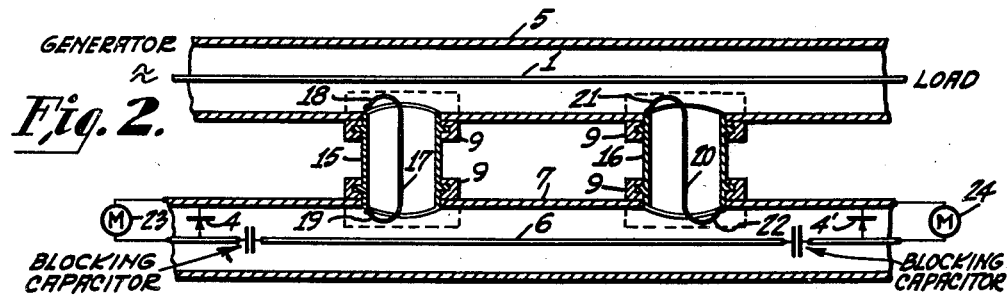
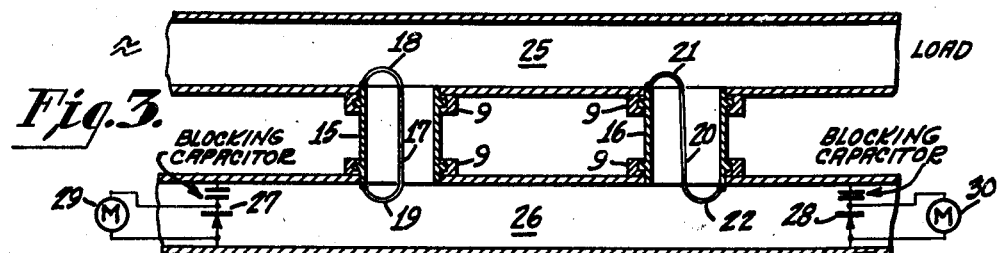
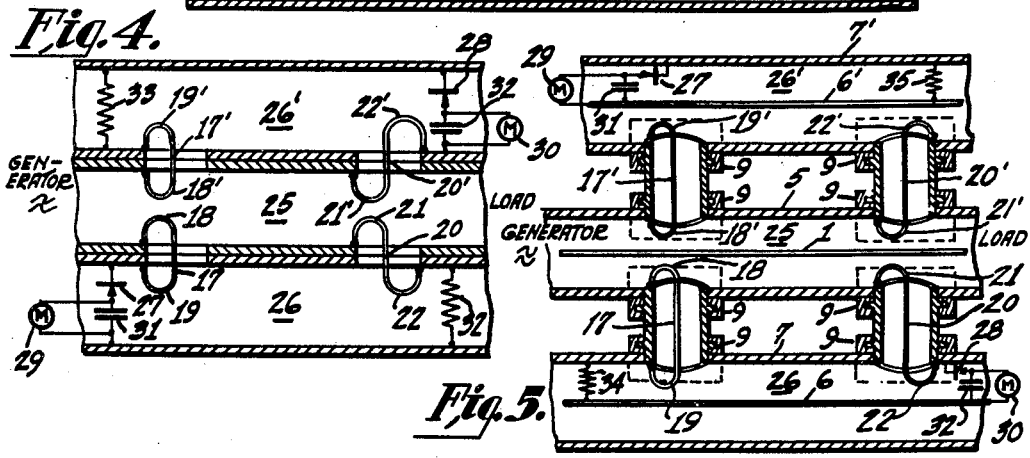
Inventor
NATHANIEL I. KORMAN

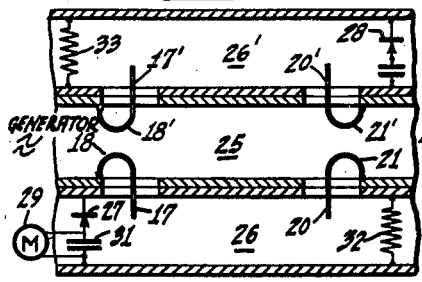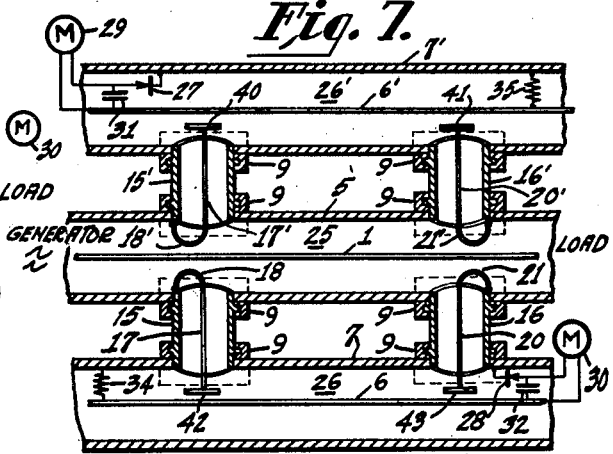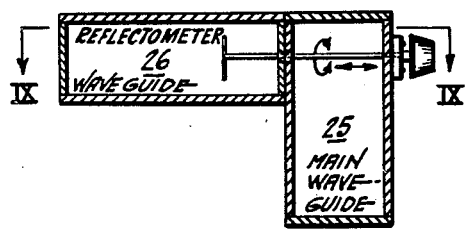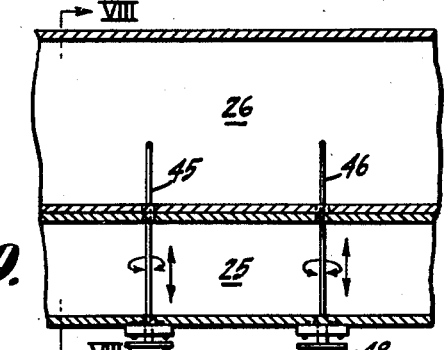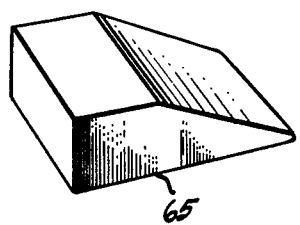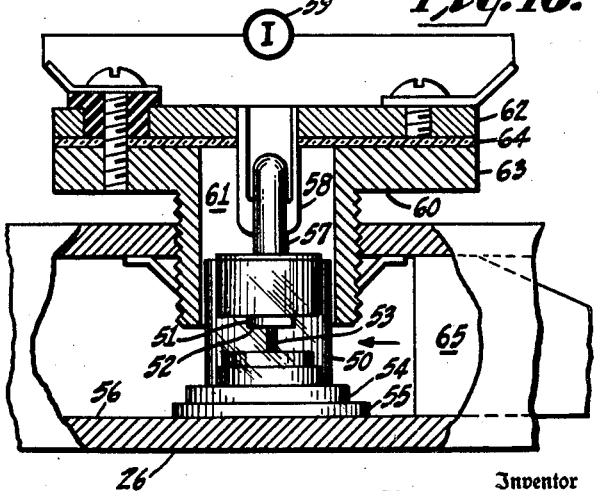

Patented July 1, 1947

2,423,390

UNITED STATES PATENT OFFICE 2,423,390

REFLECTOMETER FOR TRANSMISSION LINES AND WAVE GUIDES

Nathaniel I. Korman, Camden, N. J., assignor to Radio Corporation of America, a corporation of Delaware Application March 29, 1944, Serial No. 528,655

14 Claims. (Cl. 171—95)

This invention relates generally to high frequency wave transmission and more particularly to substantially non-frequency selective reflectometers for measuring directly the magnitudes of traveling waves in high frequency transmission lines and waveguides.

One of the most useful measurements customarily made on transmission lines or waveguides is the measurement of the standing wave ratio. The same information obtainable from standing wave ratio measurements may be obtained by measuring separately the forward and backward traveling wave magnitudes. Ordinarily, measurements of the standing wave ratio require the use of a movable probe in order to determine the wave magnitude at various predetermined points along the transmission line. Movable elements in ultra-high frequency coaxial transmission lines and waveguides involve difficulties due to imperfect electrical contact between the transmission line and the movable probe element which may introduce considerable error in the standing wave measurements. Furthermore, standing wave ratio measurements heretofore have necessitated a series of at least two consecutive measurements of wave magnitude at different points along the transmission line.

Heretofore, attempts to measure separately the magnitudes of the forward and backward traveling waves without the necessity of the adjustment of a probe element have been limited to measurements at a single frequency, or to apparatus wherein the transmitted energy is continuously coupled to the measuring apparatus over distances comparable to one half, or preferably several, wavelengths at the operating frequency.

The instant invention permits separate measurements of the magnitudes of forward and backward traveling waves in a transmission line or waveguide without the limitation of frequency selectivity in the measuring apparatus. It represents an improvement over the device disclosed and claimed in the copending U. S. application of Carl G. Sontheimer and Nathaniel I. Korman, Serial No. 528,785, filed March 30, 1944, wherein an energy transmission waveguide is coupled continuously, for a distance of one half to several wavelengths, through narrow slots between said transmission waveguide and two measurement waveguides. One of the measurement waveguides includes wave detecting means responsive only to forward traveling waves; the other measurement waveguide includes wave detecting means responsive only to backward traveling waves. Separate indicators responsive to the separate wave detecting means provide indications representative of the relative magnitudes of the forward and backward traveling waves. Said device is substantially independent of the operating frequency except for the necessity of coupling over a distance at least one half wavelength at the lowest operating frequency.

The instant invention contemplates the use of two separate lumped wave pickup and measuring devices each polarized to detect and indicate the magnitudes of waves traveling in different directions along the transmission line. It provides a much more compact construction for the measurement of waves having frequencies over a relatively wide frequency band. One embodiment of the invention is applied to coaxial transmission lines. Another embodiment of the invention contemplates the application of the principles thereof to waveguide transmission systems. Both embodiments of the invention employ two pickup coupling means of opposite sense for detecting separately the forward and backward traveling waves. Either inductive or capacitive couplings of opposite sign may be utilized. In either case, fixed complementary inductive or capacitive coupling between the transmission and measurement lines also may be provided.

Among the objects of the invention are to provide an improved method of and means for measuring standing waves on a high-frequency transmission line. Another object of the invention is to provide an improved method of and means for measuring separately the forward and backward traveling waves on a high-frequency transmission circuit. Another object of the invention is to provide an improved reflectometer for measuring the magnitudes of standing waves on a coaxial transmission line. A further object of the invention is to provide an improved method of and means for detecting and measuring standing waves in a waveguide transmission system.

Other objects of the invention include improved methods of and means for measuring forward and backward traveling waves on a high-frequency transmission line by employing longitudinally fixed energy pickup means for said measurements. Another object of the invention is to provide an improved method of and means for measuring standing waves on a high-frequency transmission system wherein said measurements are substantially independent of the frequency of said standing waves. A further object of the invention is to provide an improved method of and means for measuring standing waves on a high-frequency transmission line wherein the measuring apparatus is substantially reactive.

Referring to the drawings, Figure 1 is a cross-sectional elevational view of a frequency-selective device of the type known in the prior art, Figure 2 is a cross-sectional elevational view of a non-frequency selective first embodiment of the invention, Figures 3, 4 and 5 are cross-sectional elevational views of modifications of said first embodiment of the invention, Figure 6 is a cross-sectional elevational view of a second embodiment of the invention, Figure 7 is a cross-sectional view of a modification of said second embodiment of the invention, Figures 8 and 9 are cross-sectional elevational and plan views, respectively, of a third embodiment of the invention, Figure 10 is a cross-sectional elevational view of a microwave detector forming a component of said invention, and Figure 11 is a perspective view of a wave reflection reducing attenuator forming another component of said invention. Similar reference characters are applied to similar elements throughout the drawings.

Figure 1 shows a type of reflectometer, known in the prior art, wherein measurements of forward and backward standing waves upon a first coaxial transmission line 1, 5, may be indicated by second and first reflectionless detectors 4', 4, respectively, terminating the ends of a second coaxial transmission line 6, 7. Coupling between the first and second coaxial transmission lines is accomplished by fixed third and fourth coaxial line sections 11, 12 and 13, 14, respectively, which are coupled between the first and second transmission lines at an interval X corresponding to an odd multiple of a quarter wavelength at the operating frequency. The inner conductors 11, 13 of the third and fourth coupling coaxial transmission lines are not connected to either of the inner conductors 1, 6 of the first and second transmission lines, respectively, but merely provide loose coupling between said transmission lines. At the point A on the main transmission line 1, 5, the forward traveling waves on the line, representing the waves traveling from the generator to the load, are indicated by the arrow pointing from left to right and are assumed to have a voltage magnitude F. Similarly, the backward traveling waves on said line, representing the waves traveling from the load to the generator, are indicated by the arrow pointing from right to left, and the magnitudes thereof are represented by B.

At point (A) on the main line the voltage is $F+B$; at point (C) the voltage is $Fe^{-j\beta x}+Be^{j\beta x}$, wherein $e$ is the natural logarithmic base, $\beta$ is the propagation constant $$\left(\frac{2\pi}{\lambda}\right), j=\sqrt{-1}$$

and $x$ is the distance between the coupling elements expressed in the same units as the wavelength term $\lambda$ of the propagation constant $\beta$. A fraction of $K_1$ of the voltage across the main line at point (A) is picked up by the third coupling line 11, 12, which then initiates equal forward and backward waves on the second, or reflectometer, line 6, 7, the magnitude of said waves being represented by $$\frac{K_1}{2}(F+B)$$

wherein $K_1$ is the coupling constant between the transmission line and the first coupling line.

Similarly, at point (C) equal forward and backward waves are induced in the reflectometer line 6, 7, which are represented by $$\frac{1}{2}K_2(Fe^{-j\beta x}+Be^{j\beta x})$$

wherein $K_2$ is the coupling constant between the transmission line and the second coupling line. If the detector-indicator terminations 4 and 4' of the reflectometer line 6, 7 are reflectionless, the voltages $V_4$ and $V_{4'}$ at 4 and 4' are, respectively, (1) $\begin{cases} V_4 = \frac{K_1}{2}(F+B) + \frac{K_2}{2}(Fe^{-j\beta x}+Be^{j\beta x})e^{-j\beta x} \\ V_{4'} = \frac{K_1}{2}(F+B)e^{-j\beta x} + \frac{K_2}{2}(Fe^{-j\beta x}+Be^{j\beta x}) \end{cases}$ (2) $\begin{cases} V_4 = F\left(\frac{K_1}{2}+\frac{K_2}{2}e^{-j2\beta x}\right) + B\left(\frac{K_1}{2}+\frac{K_2}{2}\right) \\ V_{4'} = F\left(\frac{K_1}{2}e^{-j\beta x}+\frac{K_2}{2}e^{-j\beta x}\right) + B \\ \qquad \left(\frac{K_1}{2}e^{-j\beta x}+\frac{K_2}{2}e^{+j\beta x}\right) \end{cases}$ if $K_1=K_2=K$ (3) $\begin{cases} V_4 = F(Ke^{-j\beta x}\cos\beta x) + BK \\ V_{4'} = F(Ke^{-j\beta x}) + B(K\cos\beta x) \end{cases}$ if $$\beta x = \frac{\pi}{2}$$

(4) $\quad V_4 = KB$
$\quad V_{4'} = jKF$

The voltage at the first detector 4 is proportional to the backward traveling wave on the main line 1, 5, and the voltage at the second detector 4' is proportional to the forward traveling wave. However, also it is necessary for $x$ to be an odd number of quarter wavelengths long. Obviously, this condition can obtain only at discrete frequencies.

The device of Figure 2 is an improvement upon the prior art device of Figure 1, in that by employing substantially oppositely-phased inductive coupling between the first and second coaxial transmission lines 1, 5 and 6, 7, the conditions limiting the operation of the device to a single frequency are eliminated, since the use of such oppositely-phased couplings eliminates the necessity that the couplings be located some odd number of quarter wavelengths apart. That is, if $K_1=-K_2=K$ in Equation 2 then (5) $\quad V_4 = F(jKe^{-j\beta x}\sin\beta x)$
$\quad V_{4'} = B(-jK\sin\beta x)$ It will be seen that the voltage across the first reflectionless detector 4 will be proportional to the forward traveling wave upon the main transmission line 1, 5 and the voltage across the second reflectionless detector 4' will be proportional to the magnitude of the backward traveling wave upon the main transmission line 1, 5. Furthermore, by reversing the phase of the inductive couplings between the first and second coaxial transmission lines, the reflectometer becomes substantially non-frequency selective. In the special cases where $\beta x$ is any integral multiple of 180°, the sensitivity of the wave detecting circuit is zero, whereby traveling wave measurements are not obtainable.

The oppositely-phased inductive couplings between the first and second coaxial lines are provided by fixed coaxial line outer conductor sections 15, 17 and 16, 20 interconnecting the outer conductors of the first and second coaxial transmission lines 1, 5 and 6, 7, respectively, and arranged to be rotatably adjustable within bearings 9 in the apertured walls of the outer conductors 5, 7 of the first and second lines, respectively. The ends of the inner conductor 17 of the first coaxial line section 15, 17, are terminated in similarly-phased coupling loops 18, 19 capacitively and inductively coupled, respectively, to the inner conductor 1 and inner conductor 6 of the first and second coaxial lines. The ends of the inner conductor 20 of the second coaxial line section 16, 20, are terminated in oppositely-phased coupling loops 21, 22 which are capacitively and inductively coupled, respectively, to the inner conductors 1, 6, of the first and second coaxial lines. The ends of the coupling loops are terminated on the inner surfaces of the respective coaxial line outer conductors. The coaxial line sections with their respective coupling loops, are rotatably adjustable with respect to the inner conductors 1, 6 of the first and second transmission lines in order to obtain optimum coupling adjustment for correcting for induced wave amplitude variations due to discontinuities in the lines and structural variations in the coupling units.

The wave detectors 4, 4', connected across the line at opposite ends of the second coaxial transmission line 6, 7, should be substantially reflectionless, in order to prevent spurious indications due to reflections of waves which otherwise would be reflected between the two detectors. The first reflectionless detector 4 is connected to any suitable indicating instrument 23 such, for example, as a sensitive direct current meter. Similarly, the second reflectionless detector 4' is connected to a second indicating instrument 24 of the same type.

The reflectionless detectors 4, 4' may be any of the many conventional types, such as, crystal detector, thermionic discharge tube, thermocouple, bolometer, etc.

Figure 3 is similar to the device described and illustrated in Figure 2 with the exception that the main transmission line comprises a waveguide 25, and the reflectometer transmission line comprises a second waveguide 26. Wave energy transmitted through the main waveguide 25 is coupled to the second waveguide 26 through short coaxial line sections 15, 17 and 16, 20 which include similarly and oppositely-phased coupling loops 18, 19 and 21, 22 of the type described heretofore in Figure 2. The coaxial line sections 15, 17 and 16, 20 are rotatable within bearings 9 to provide for optimum coupling adjustment. First and second substantially reflectionless wave detectors 27, 28 are disposed at opposite ends and within the second waveguide 26. The reflectionless detectors 27, 28 are connected to indicating instruments 29, 30, respectively.

It may be shown that if, in any of the reflectometers illustrated in Figures 1, 2 and 3, one of the detectors is not perfectly reflectionless its indication will still be proportional to the corresponding traveling wave in the main transmission line or guide, but the indication of the other detector will be in error by the amount of the reflection of the first mentioned detector. Because it is generally easier to construct a reflectionless termination than a reflectionless detector, the reflectometer configurations shown in Figures 4, 5, 6 and 7 are preferred over those of Figures 1, 2 and 3. For example, Figure 11 illustrates a tapered plug of material (such as Bakelite) which, because of losses, makes an excellent reflectionless termination for a rectangular waveguide.

Figure 4 is similar to Figure 3 with the exception that the main waveguide 25 is coupled to two separate reflectometer waveguides 26, 26' through separate oppositely-phased coupling loops 18, 19, 21, 22 and 18', 19', 21', 22', respectively.

Forward-traveling waves, that is, waves traveling from left to right within the main waveguide 25, are operative upon the first detector 27 (which need not be reflectionless) to provide indications of the forward-traveling wave magnitude upon the first indicating instrument 29 which is shunted across the bypass capacitor 31 forming a part of the first detector element. Backward-traveling waves coupled into the reflectometer waveguide 26 are substantially absorbed by means of a matched loading resistor plug 32 disposed across the opposite end of said reflectometer guide from the first detector 27. The matching resistor plug may be a tapered plug of the type illustrated in Figure 11 wherein the plug is coated with or includes a resistive material to provide a resistive path which matches the surge impedance of the reflectometer guide 26. Similarly, the second reflectometer guide 26' couples backward-traveling wave energy in the main waveguide 25 to a second detector 28 to provide indications on a second indicating meter 30 which is shunted across the capacitor 32 forming a part of the second detector 28 (which need not be reflectionless). Similarly, forward-traveling waves coupled into said second reflectometer guide 26' are substantially absorbed by a second tapered resistive plug 33 disposed across the end of said reflectometer guide remote from the second detector 28. The connotations "first" and "second" as applied to the wave detectors, indicators, capacitors, loading resistors and auxiliary transmission lines are intended solely for the purpose of identification in following the description of the various embodiments of the invention.

Figure 5 is similar in all respects to Figure 4 with the exception that coaxial transmission lines are employed for the main transmission line 25 and the reflectometer transmission lines 26, 26'. Wave energy is coupled from the main transmission line 25 into the first and second reflectometer transmission lines 26, 26' through two pairs of short coaxial lines of the type illustrated in Figure 3. Backward-traveling waves on the main transmission line 25 are indicated on the second indicating meter 30 and forward-traveling wave magnitudes on said main transmission line 25 are indicated in the first indicating meter 29 coupled to the second reflectometer line 26'. Resistive elements 34, 35 terminate at ends of the first and second reflectometer lines 26, 26' remote from the wave detectors 28, 27, respectively.

Figure 6 is similar in all respects to the device described in Figure 4 with the exception that the coupling loops provide inductive coupling within the main waveguide 25 but comprise straight conductive radiators which effectively provide capacitive coupling within the reflectometer waveguides 26, 26'.

Figure 7 is similar in all respects to the device described in Figure 5 with the exception that the short coupling coaxial lines interconnecting the main transmission line 25 with the reflectometer transmission lines 26, 26' include coupling loops within the main transmission line and capacitive elements 40, 41, 42, 43 coupled to the inner conductors of the reflectometer transmission lines and terminating the ends of the inner conductors of the short coupling coaxial lines. The coupling devices thus provide inductive and capacitive coupling to the main transmission line 25 and effectively provide capacitive coupling to the reflectometer transmission lines 26, 26'.

In the devices described in Figures 4, 5, 6, and 7 it is not essential that the wave detectors be substantially reflectionless since the terminating resistors disposed at the respective opposite ends of the reflectometer lines effectively prevent wave reflections within each of the reflectometer lines and any spurious reflections from the individual wave detectors would be substantially absorbed by the corresponding terminating resistive elements.

Referring to Figures 8 and 9, a modification of the embodiment of the invention described and illustrated in Figure 3 comprises a main waveguide 25 and a reflectometer waveguide 26. Wave energy is coupled between the main and reflectometer waveguides 25, 26, respectively, by means of two L-shaped conductive elements 45, 46 which extend straight through the main waveguide 25 and a short distance into the reflectometer waveguide 26. A first adjusting knob 47 terminates one end of the coupling element 45 which extends outside of the main waveguide 25, thereby providing for rotational and translational adjustment of the L-shaped portion of the coupling element 45 which extends into the reflectometer waveguide 26. Similarly, a second adjusting knob 48 provides rotational and translational adjustment of the L-shaped portion of the second coupling element 46 extending into the reflectometer waveguide 26. In operation, the L-shaped portions of the coupling elements 45, 46 would be substantially oppositely-phased in order to provide coupling of opposite phase as explained heretofore in the device of Figure 3. It will be seen that the embodiment of the invention illustrated in Figures 8 and 9 would require substantially reflectionless detectors of the same general type as required in the device of Figure 3, or that two sets of reflectometer coupling units of the type shown in Figures 8 and 9 may be used in conjunction with detectors and reflectionless terminations in an arrangement similar to those shown in Figures 4, 5, 6 and 7.

It should be understood that each of the embodiments of the invention described heretofore will provide wave magnitude indications wherein the wave detector sensitivity increases substantially linearly with frequency. If desired, the detector sensitivity may be made substantially constant over a wide frequency range by connecting an inductive reactance, such for example, as a choke coil in series with the wave detector.

An ultra-high-frequency crystal detector, suitable for use as the wave detectors included in the various embodiments and modifications of the invention described heretofore, is described and claimed in the copending U. S. application of Wendell L. Carlson Serial No. 507,755 filed October 26, 1943, and assigned to the same assignee as the instant application. Briefly, the device described in said copending application includes in Figure 10 a crystal cartridge 50 enclosing a silicon crystal 51 having a knife edge 52 in contact with a tungsten "catwhisker" 53.

One end terminal 54 of the crystal assembly is retained within a contacting ring 55 secured to the inner wall 56 of the reflectometer waveguide 26. The remaining contact 57 of the crystal assembly engages contact springs 58 which are connected to one terminal of an indicator 59. The remaining terminal of the indicator 59 is connected to a cylindrical conductive shell 60 which includes an adjustable anti-resonant cavity 61. The capacitor formed between a conductive plate 62 connected to the contact springs 58 and the enlarged cylindrical portion 63 of the anti-resonant cavity, which elements 62, 63 are separated by a mica sheet 64, provides effective bypassing of ultra-high-frequency voltage components across the indicator 59. In the embodiments and modifications of the invention requiring substantially reflectionless detectors the Carlson detector may be employed in combination with a tapered attenuating plug 65 as shown in Figure 11. The tapered plug conformation shown in Figure 11 also may include a resistive surface or resistive material, and may be employed as the terminating resistor in the devices shown in Figures 4 and 6.

It will be seen that in principle, the instant invention differs from known systems for high-frequency power and wave magnitude measurements in that it simultaneously incorporates all of the following desirable features. First, the device provides measurements which are not directly dependent upon frequency. Second, all transfer impedances are reactive. Third, the accuracy of the system is independent of the relative positions of the wave coupling means on the transmission lines. Fourth, accurate measurements may be made at frequencies substantially higher and lower than are practicable in one unit with other known systems. Fifth, due to the elimination of moving probes, measurement accuracy is substantially increased in the centimeter wave range.

Thus the invention described comprises several modifications of an improved reflectometer for measuring the magnitudes of standing waves in a high-frequency transmission system, wherein said measurements are substantially independent of operating frequency and wherein simultaneous measurements of forward and backward traveling waves are directly obtainable without the use of longitudinally movable wave probes.

I claim as my invention:

1. A reflectometer for measuring traveling waves over a wide frequency range on a radio frequency transmission line including a first indicator, a second indicator, first means aperiodically inductively coupled between said line and said indicators, and second means aperiodically inductively coupled between said line and said indicators, said first and said second coupling means being in phase opposition and both of said coupling means cooperating to provide indications on said first indicator of the magnitude of forward-traveling waves and indications on said second indicator of the magnitude of backward-traveling waves on said line.

2. A reflectometer for measuring traveling waves on a radio frequency transmission line including a first indicator, a second indicator, first means providing capacitive and inductive coupling between said line and said indicators, and second means providing capacitive and inductive coupling between said line and said indicators, said first and said second coupling means being in phase opposition and both of said coupling means cooperating to provide indications on said first indicator of the magnitude of forward-traveling waves and indications on said second indicator of the magnitude of backward-traveling waves on said line.

3. A reflectometer for measuring traveling waves on a radio frequency transmission line including a first indicator, aperiodic means providing capacitive and inductive coupling between said line and said first indicator to provide a first indication of the magnitude of forward-traveling waves on said line, a second indicator, and aperiodic means providing capacitive and reversed inductive coupling between said line and said second indicator to provide a second indication of the magnitude of backward-traveling waves on said line.

4. A reflectometer for measuring traveling waves on a radio frequency transmission line including a first indicator, substantially non-frequency selective means providing capacitive and inductive coupling between said line and said first indicator to provide a first indication of the magnitude of forward-traveling waves on said line, a second indicator, and substantially non-frequency selective means providing inductive and reversed capacitive coupling between said line and said second indicator to provide a second indication of the magnitude of backward-traveling waves on said line.

5. A reflectometer for measuring traveling waves on a coaxial transmission line including a first indicator, substantially non-frequency selective means providing capacitive and inductive coupling between said coaxial line and said first indicator to provide a first indication of the magnitude of forward-traveling waves on said line, a second indicator, and substantially non-frequency selective means providing capacitive and reversed inductive coupling between said coaxial line and said second indicator to provide a second indication of the magnitude of backward-traveling waves on said coaxial line.

6. A reflectometer for measuring traveling waves on a waveguide transmission line including a first indicator, substantially non-frequency selective means providing capacitive and inductive coupling between said waveguide line and said first indicator to provide a first indication of the magnitude of forward-traveling waves on said line, a second indicator, and substantially non-frequency selective means providing capacitive and reversed inductive coupling between said waveguide line and said second indicator to provide a second indication of the magnitude of backward-traveling waves on said waveguide line.

7. A reflectometer for measuring traveling waves on a coaxial transmission line including a first indicator, substantially non-frequency selective means including a second line and a first coupling loop intercoupling said lines, means connecting said first indicator to terminate one end of said second line, said first coupling loop and said second line providing capacitive and inductive coupling between said coaxial line and said first indicator to provide a first indication of the magnitude of forward-traveling waves on said line, a second indicator connected to terminate the remaining end of said second line, and substantially non-frequency selective means including a second coupling loop intercoupling said lines and oppositely-phased with respect to said first loop providing capacitive and reversed inductive coupling between said coaxial line and said second indicator to provide a second indication of the magnitude of backward-traveling waves on said coaxial line.

8. A reflectometer for measuring traveling waves on a radio frequency transmission line including a first indicator, means providing fixed capacitive and adjustable inductive coupling between said line and said first indicator to provide a first indication of the magnitude of forward-traveling waves on said line, a second indicator, and means providing fixed capacitive and adjustable reversed inductive coupling between said line and said second indicator to provide a second indication of the magnitude of backward-traveling waves on said line.

9. A reflectometer for measuring traveling waves on a coaxial transmission line including a first indicator, means providing fixed capacitive and adjustable inductive coupling between said line and said first indicator to provide a first indication of the magnitude of forward-traveling waves on said line, a second indicator, and means providing fixed capacitive and adjustable reversed inductive coupling between said line and said second indicator to provide a second indication of the magnitude of backward-traveling waves on said line.

10. A reflectometer for measuring traveling waves on a waveguide transmission line including a first indicator, means providing fixed capacitive and adjustable inductive coupling between said line and said first indicator to provide a first indication of the magnitude of forward-traveling waves on said line, a second indicator, and means providing fixed capacitive and adjustable reversed inductive coupling between said line and said second indicator to provide a second indication of the magnitude of backward-traveling waves on said line.

11. A reflectometer for measuring traveling waves on a first waveguide transmission line including a first indicator, substantially non-frequency selective means including a second waveguide line and a first coupling loop intercoupling said waveguide lines, means connecting said first indicator to terminate one end of said second waveguide line, said first coupling loop and said second waveguide line providing capacitive and inductive coupling between said first waveguide line and said first indicator to provide a first indication of the magnitude of forward-traveling waves on said line, a second indicator connected to terminate the remaining end of said second waveguide line, and substantially non-frequency selective means including a second coupling loop intercoupling said waveguide lines and oppositely-phased with respect to said first loop providing capacitive and reversed inductive coupling between said first waveguide line and said second indicator to provide a second indication of the magnitude of backward-traveling waves on said first waveguide line.

12. A reflectometer for measuring traveling waves on a first radio frequency transmission line, including a second transmission line, an indicator coupled to said second transmission line, first means providing substantially only capacitive coupling between said lines, second means providing substantially only capacitive coupling between said lines, said first and said second line intercoupling means being in phase opposition and all of said coupling means cooperating to provide indications on said indicator of the magnitude of waves traveling substantially in a single direction along said first line.

13. A wide frequency range reflectometer for measuring traveling waves on a first radio frequency transmission line, including a second transmission line, an indicator coupled to said second transmission line, first means providing aperiodic inductive coupling between said lines, second means providing aperiodic inductive coupling between said lines, said first and said second line intercoupling means being in phase opposition and all of said coupling means cooperating to provide indications on said indicator of the magnitude of waves traveling substantially in a single direction along said first line.

14. A reflectometer for measuring traveling waves on a first radio frequency transmission line, including a second transmission line, an indicator coupled to said second transmission line, first means substantially only capacitively coupled to one of said lines and aperiodically inductively coupled to the other of said lines, second means substantially only capacitively coupled to one of said lines and aperiodically inductively coupled to the other of said lines, said first and said second means providing couplings between said lines substantially in relative phase opposition and all of said couplings cooperating to provide indications on said indicator of the magnitude of waves traveling substantially in a single direction along said first line.

NATHANIEL I. KORMAN.

REFERENCES CITED

The following references are of record in the file of this patent:

UNITED STATES PATENTS

| Number | Name | Date |
|---|---|---|
| 2,191,271 | Carter | Feb. 20, 1940 |
| 2,106,713 | Bowen | Feb. 1, 1938 |
| 2,151,118 | King et al. | Mar. 21, 1939 |
| 2,375,223 | Hansen et al. | May 8, 1945 |

FOREIGN PATENTS

| Number | Country | Date |
|---|---|---|
| 545,936 | Great Britain | June 18, 1942 |